(12) United States Patent
Pratt (10) Patent No.: US 9,464,654 B2
(45) Date of Patent: Oct. 11, 2016

(54) FASTENER AND METHOD OF INSTALLING SAME

(71) Applicant: John D. Pratt, Laguna Niguel, CA (US)

(72) Inventor: John D. Pratt, Laguna Niguel, CA (US)

(*) Notice: Subject to any disclaimer, the term of this patent is extended or adjusted under 35 U.S.C. 154(b) by 113 days.

(21) Appl. No.: 14/313,324

(22) Filed: Jun. 24, 2014

(65) Prior Publication Data

US 2015/0010370 A1 Jan. 8, 2015

Related U.S. Application Data

(60) Provisional application No. 61/842,170, filed on Jul. 2, 2013.

(51) Int. Cl.
F16B 19/10 (2006.01)

(52) U.S. Cl.
CPC ....... *F16B 19/1072* (2013.01); *F16B 19/1063* (2013.01)

(58) Field of Classification Search
CPC .................. F16B 19/1072; F16B 19/1063
USPC ................................. 411/34, 39, 43
See application file for complete search history.

(56) References Cited

U.S. PATENT DOCUMENTS

| | | | |
|---|---|---|---|
| 2,282,711 A | 5/1942 | Eklund | |
| 2,765,699 A * | 10/1956 | La Torre | F16B 19/1063 29/509 |
| 2,887,003 A | 5/1959 | Brilmyer | |
| 2,974,558 A | 3/1961 | Hodell | |
| 3,179,144 A | 4/1965 | Brown | |
| 3,262,353 A | 7/1966 | Waeltz et al. | |
| 3,277,771 A * | 10/1966 | Reynolds | F16B 19/1063 29/509 |
| 3,596,948 A * | 8/1971 | Spoehr | F16B 19/1063 403/408.1 |
| 4,033,222 A | 7/1977 | Wilson | |
| 4,089,247 A | 5/1978 | Dahl et al. | |
| 4,168,650 A | 9/1979 | Dahl et al. | |
| 4,364,697 A | 12/1982 | Binns | |
| 4,451,189 A | 5/1984 | Pratt | |
| 4,627,775 A | 12/1986 | Dixon | |
| 4,659,271 A | 4/1987 | Pratt et al. | |
| 4,752,169 A | 6/1988 | Pratt | |
| 4,967,463 A | 11/1990 | Pratt | |
| 5,056,973 A * | 10/1991 | Pratt | F16B 19/1054 411/34 |

(Continued)

FOREIGN PATENT DOCUMENTS

CN 203516322 U 4/2014

OTHER PUBLICATIONS

International Search Report & Written Opinion of PCT/US2014/043850 dated Mar. 27, 2015.

*Primary Examiner* — Flemming Saether
(74) *Attorney, Agent, or Firm* — Barnes & Thornburg LLP (57) ABSTRACT

A fastener comprises a body having an enlarged head at a first end, a tapered ramp at a second end, a cylindrical shank disposed between the enlarged head and the tapered ramp, and a passage extending between the first and second ends and including threads. The fastener further includes a generally cylindrical corebolt disposed within the passage of the body and having an enlarged head, a breaking groove, and a stop shoulder that is configured to cause an abrupt increase in resistance to threading the corebolt into the body when the breaking groove is substantially flush with an outer surface of the enlarged head. A grip compensator is disposed on the corebolt in abutment with the enlarged head of the corebolt. A deformable sleeve is movably disposed over a portion of the corebolt and disposed between the grip compensator and the tapered ramp of the body.

10 Claims, 13 Drawing Sheets

(56) References Cited

U.S. PATENT DOCUMENTS

| | | | |
|---|---|---|---|
| 5,066,179 A | 11/1991 | Pratt | |
| 5,498,110 A * | 3/1996 | Stencel | F16B 19/1063 411/34 |
| 5,816,761 A * | 10/1998 | Cassatt | F16B 19/1072 411/34 |
| 6,036,418 A * | 3/2000 | Stencel | F16B 19/1063 411/38 |
| 7,033,120 B2 * | 4/2006 | Hufnagl | F16B 37/067 411/283 |
| 8,322,015 B2 | 12/2012 | Pratt et al. | |
| 8,348,566 B2 | 1/2013 | Pratt | |
| 2012/0263556 A1 | 10/2012 | Pratt | |

* cited by examiner

Torque-rotation Plots for 1/4" Diameter Fastener   FIG. 12A

Torque-rotation Plots for 1/4" Diameter Fastener   FIG. 12B

Torque-rotation Plots for 1/4" Diameter Fastener  FIG. 12C

Torque-rotation Plots for 1/4" Diameter Fastener  FIG. 12D

FASTENER AND METHOD OF INSTALLING SAME

CROSS REFERENCE TO RELATED APPLICATIONS

This application claims the benefit of priority under 35 U.S.C. §119(e) to U.S. Provisional Patent Application No. 61/842,170, filed Jul. 2, 2013. The disclosure set forth in the referenced application is incorporated herein by reference in its entirety.

FIELD OF THE DISCLOSURE

The present disclosure relates generally to fasteners for assembly of two or more panels of a workpiece, and more particularly to a blind fastener having an installed flushness that requires little, if any, post-installation shaving or filling.

DESCRIPTION OF THE BACKGROUND

Exterior airframe joints are required to be flush to minimize aerodynamic drag. It is therefore desirable to prevent any portion of a mechanical fastener from protruding beyond a surface of an outer panel of a workpiece in which the fastener is installed. It is also preferred to prevent any portion of the fastener from being recessed within the workpiece or recessed as compared to the remainder of the fastener. Having all portions of the fastener and the surface of the outer panel of the workpiece in the same plane is referred to as the "flushness" of the fastener. Flushness goals are easily met with conventional fasteners such as solid rivets, lock bolts, and threaded pins with nuts. Many pull-type blind fasteners also exhibit acceptable installed flushness. However, threaded blind bolts have always suffered from the need to have a corebolt break-off location vary by as much as 0.103 inch so that, in some grip conditions, the corebolt either protrudes above the surface of the outer panel by this amount or, if the break-off location is positioned to never break above an exposed outer surface of an enlarged body head of the fastener, the corebolt breaks low, thereby leaving a cavity of up to 0.103 inch deep. In either case, the fastener oftentimes requires milling of the protruding corebolt or filling (potting) of the cavity to produce the desired level of aerodynamic flushness wherein the corebolt is substantially flush with the outer surface of the enlarged body head.

Protruding head fasteners are used in regions that are not aerodynamically critical and on the ground (i.e., non-flying equipment). It is also desirable with protruding head fasteners to limit protrusion of the corebolt above a top of the body head surface, so as to avoid snagging on clothing or causing an injury to persons.

SUMMARY

In illustrative embodiments, a fastener includes a body having an enlarged head at a first end, a tapered ramp at a second end, a cylindrical shank disposed between the enlarged head and the tapered ramp, and a passage extending between the first and second ends. A generally cylindrical corebolt is disposed within the passage of the body and includes an enlarged head, a breaking groove, and a stop shoulder that is configured to cause an abrupt increase in resistance to threading the corebolt into the body when the breaking groove is substantially flush with an outer surface of the enlarged head of the body. The fastener further includes a grip compensator disposed on the corebolt in abutment with the enlarged head of the corebolt and a deformable sleeve having a generally cylindrical passage therethrough. The deformable sleeve is movably disposed over a portion of the corebolt and disposed between the grip compensator and the tapered ramp of the body. The fastener further includes means for restricting rotation of the body until the sleeve has formed a blind head against a workpiece.

In further illustrative embodiments, a fastener includes a body having an enlarged head with an outer surface at a first end, a tapered ramp at a second end, a cylindrical shank disposed between the enlarged head and the tapered ramp, and a body passage extending between the first and second ends. A threaded insert is disposed within the body and includes an insert passage extending along a length thereof. The fastener further includes a generally cylindrical corebolt disposed within the body passage and the insert passage, wherein the corebolt includes an enlarged head, a breaking groove, and a stop shoulder that is configured to cause an abrupt increase in resistance to threading the corebolt into the threaded insert when the breaking groove is substantially flush with an outer surface of the enlarged head of the body. A grip compensator is disposed on the corebolt in abutment with the enlarged head of the corebolt and a deformable sleeve is movably disposed over a portion of the corebolt and disposed between the grip compensator and the tapered ramp of the body. The fastener further includes means for restricting rotation of the body until the sleeve has formed a blind head against a workpiece.

In still other illustrative embodiments, a fastener includes a body having an enlarged head with an outer surface at a first end, a tapered ramp at a second end, a cylindrical shank disposed between the enlarged head and the tapered ramp, and a passage extending between the first and second ends. A generally cylindrical corebolt is disposed within the passage of the body and includes an enlarged head, a breaking groove, and a frangible stop ring that is configured to separate from the corebolt when the fastener is installed in an under-minimum grip condition. The fastener further includes a grip compensator disposed on the corebolt in abutment with the enlarged head of the corebolt and a deformable sleeve having a generally cylindrical passage therethrough. The deformable sleeve is movably disposed over a portion of the corebolt and disposed between the grip compensator and the tapered ramp of the body. Still further, the fastener includes means for restricting rotation of the body until the sleeve has formed a blind head against a workpiece. When the fastener is installed within its design grip range, the corebolt breaks substantially flush with an outer surface of the enlarged head of the body and, when fastener is installed in an under-grip condition, the corebolt breaks at least 0.010 inch above an outer surface of the enlarged head of the body.

BRIEF DESCRIPTION OF THE DRAWINGS

Other aspects and advantages of the present invention will become apparent upon consideration of the following detailed description, wherein similar structures have like or similar reference numerals.

DETAILED DESCRIPTION

Figure 1A:
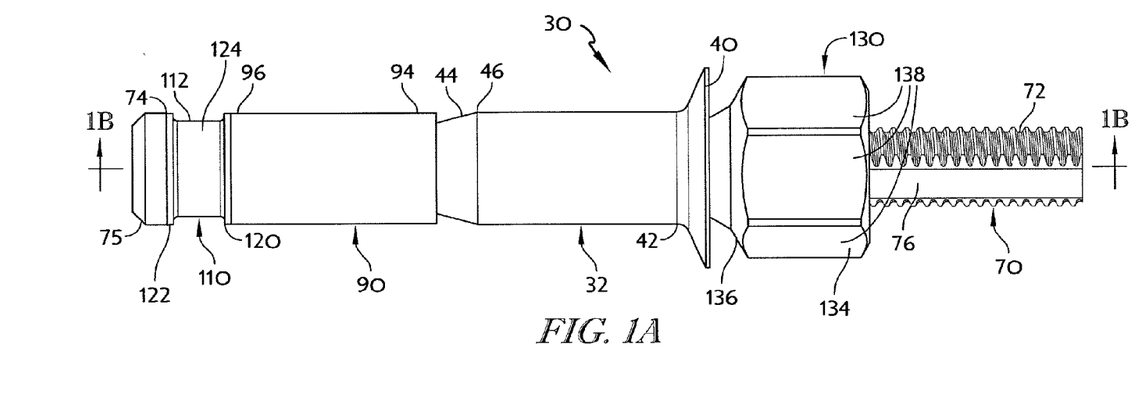
FIG. 1A is a side elevational view of an illustrative embodiment of a fastener that may be used to connect two or more panels forming a workpiece, wherein the fastener generally includes a corebolt, a body, a sleeve, a drive nut, and a grip compensator.
Figure 1B:
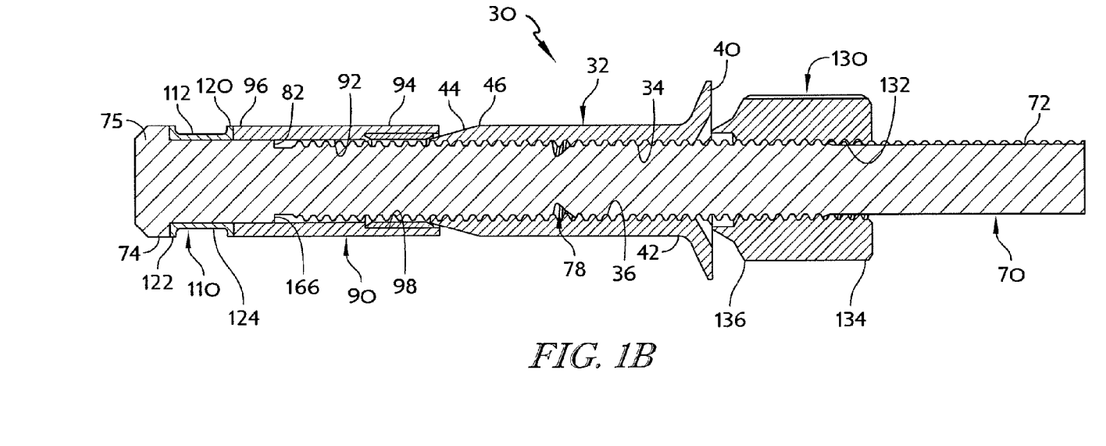
FIG. 1B is a cross-sectional view taken generally along the lines 1B-1B of FIG. 1A.

Referring to FIGS. 1A and 1B, a first embodiment of a fastener or blind bolt 30 in accordance with the present disclosure includes a generally cylindrical body 32, a corebolt 70, a deformable sleeve 90, a grip compensator 110, and a drive nut 130.

Figure 3A:
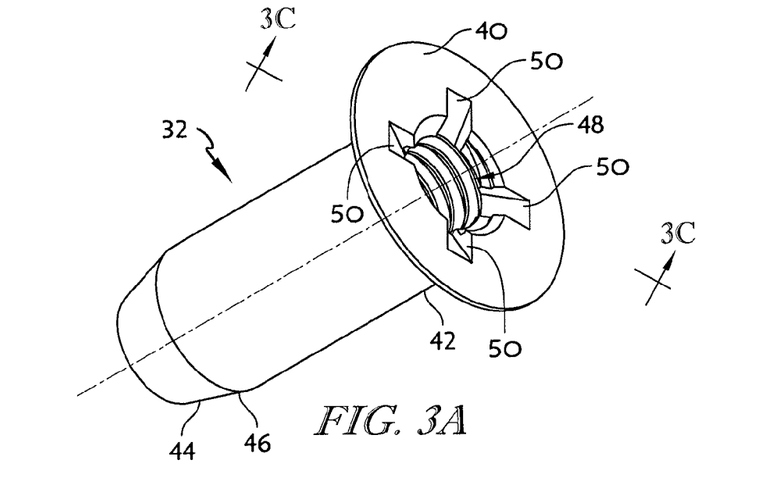
FIG. 3A is a perspective view of the body of FIGS. 1A and 1B.
Figure 3B:
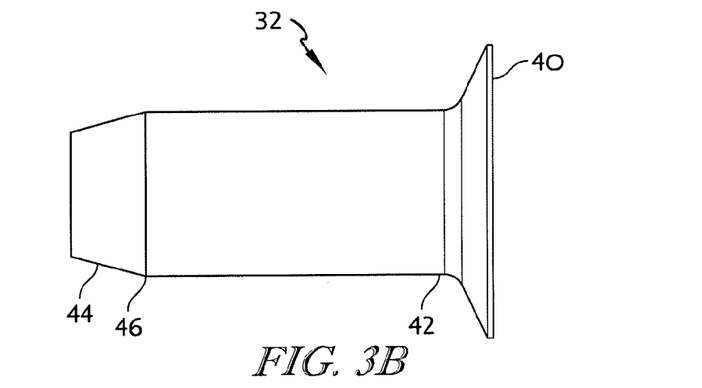
FIG. 3B is a side elevational view of the body of FIGS. 1A and 1B.
Figure 3C:
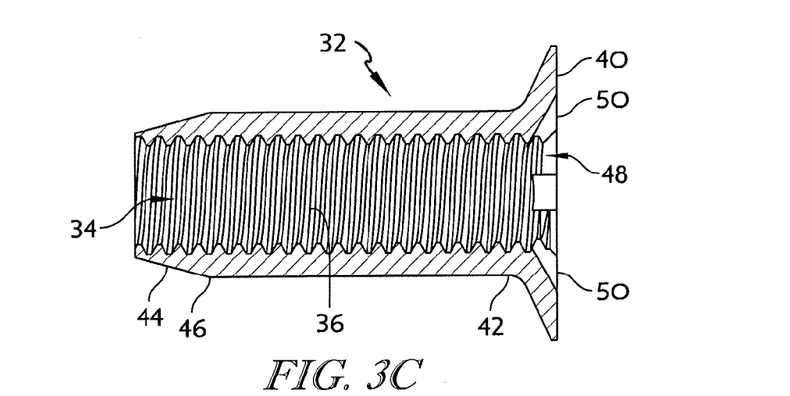
FIG. 3C is a cross-sectional view of the body taken generally along the lines 3C-3C of FIG. 3A.
Figure 4A:
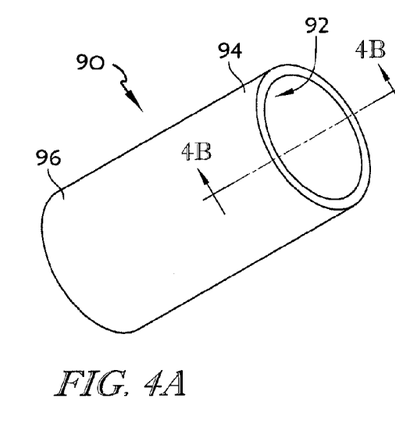
FIG. 4A is a perspective view of the sleeve of FIGS. 1A and 1B.
Figure 4B:
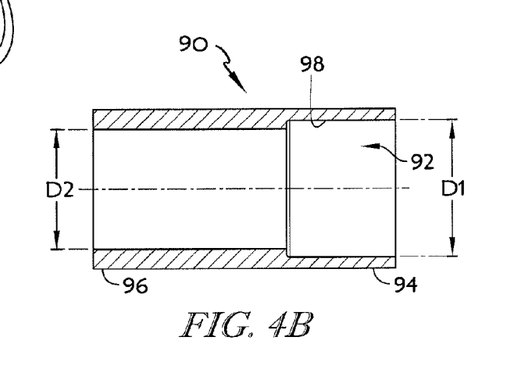
FIG. 4B is a cross-sectional view of the sleeve taken generally along the lines 4B-4B of FIG. 4A.
Figure 5A:
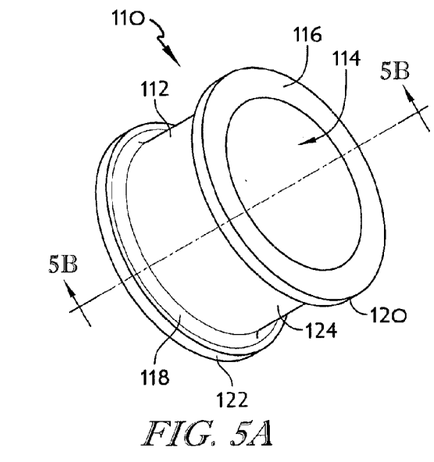
FIG. 5A is a perspective view of the grip compensator of FIGS. 1A and 1B.
Figure 5B:
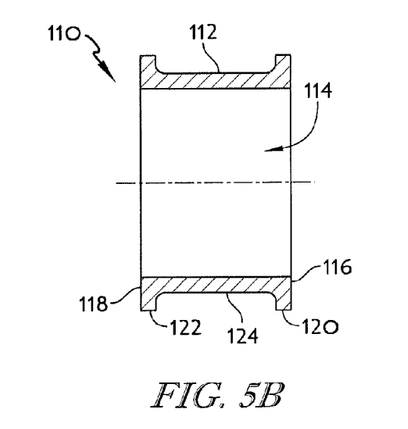
FIG. 5B is a cross-sectional view of the grip compensator taken generally along the lines 5B-5B of FIG. 5A.

Referring to FIGS. 1B and 3C, a throughbore 34 extends through a central portion of the body 32. An inner surface 36 of a wall forming the throughbore 34 is threaded for engagement with the corebolt 70, as will be discussed in greater detail hereinafter. Optionally, only a portion of the inner surface 36 may be threaded. The body 32 further includes an enlarged head 40 disposed at a first end 42 of the body 32 and a tapered ramp 44 disposed at a second end 46 of the body 32. As best seen in FIG. 3A, a central recess 48 with four radially extending recesses 50 is formed within the enlarged head 40, as will be discussed in greater detail below.

Figure 2A:
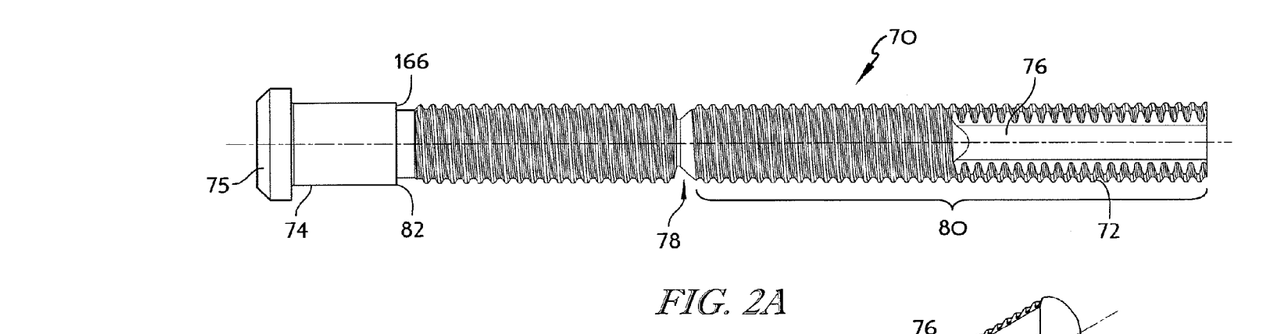
FIG. 2A is a side elevational view of the corebolt of FIGS. 1A and 1B.
Figure 2B:
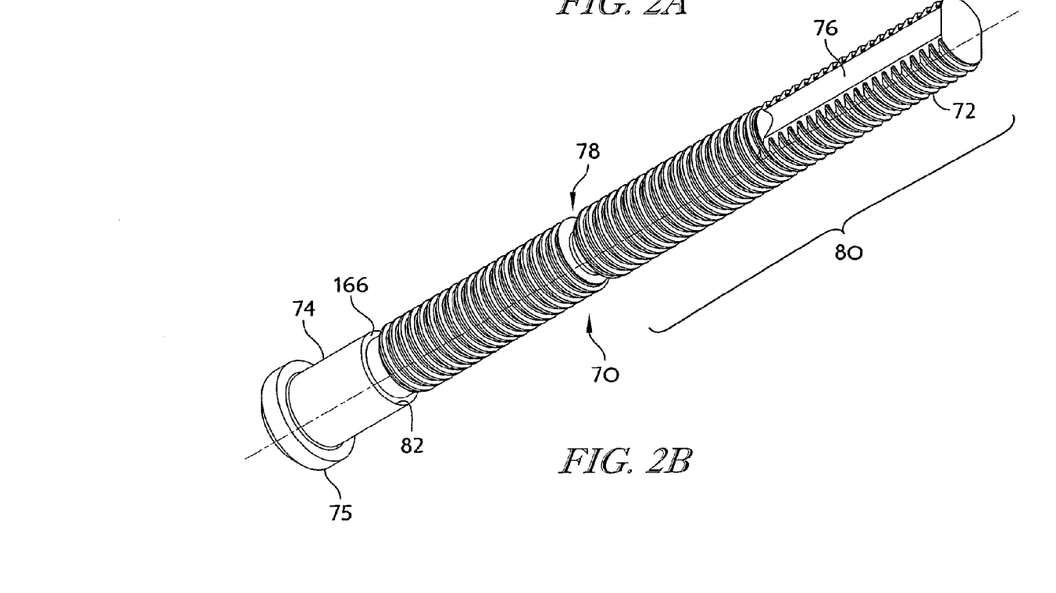
FIG. 2B is a bottom perspective view of the corebolt of FIGS. 1A and 1B.

A generally cylindrical corebolt 70, as best seen in FIGS. 1A, 1B, 2A, and 2B, is concentrically disposed within the throughbore 34 of the body 32. As best seen in FIGS. 2A and 2B, the corebolt 70 includes a first end 72 that is threaded and a second end 74 that is unthreaded and includes an enlarged head 75. The corebolt 70 may be threaded between the first end 72 and the unthreaded second end 74. Optionally, the corebolt 70 may include any number of threaded and/or unthreaded sections. The first end 72 of the corebolt 70 includes opposing wrenching surfaces 76 for engagement by a tool, as discussed in greater detail below.

Still referring to FIGS. 2A and 2B, a breaking groove 78 is disposed within the corebolt 70 between the first and second ends 72, 74. The first end 72 forms a pintail 80 that terminates at the breaking groove 78 and which separates and is discarded upon completion of installation, as will be discussed below. A stop shoulder 82 formed by an annular ledge is disposed between the unthreaded end 74 and the breaking groove 78. While the stop shoulder 82 is depicted as being an annular ledge, the stop shoulder 82 may be formed in any other suitable manner.

Referring to FIGS. 1A, 1B, 4A, and 4B, the deformable sleeve 90 has a generally cylindrical outer profile and includes a generally cylindrical throughbore 92 extending between first and second ends 94, 96 of the sleeve 90. In illustrative embodiments, the throughbore 92 may have a counterbore 98 at the first end 94. More specifically, the throughbore 92 may have a stepped diameter in that a diameter D1 at the first end 94 is greater than a diameter D2 at the second end 96. The counterbore 98 is configured to bulb during installation of the fastener 30, as will be discussed in greater detail hereinafter. In illustrative embodiments, the counterbore 98 may optionally hold a separate insert of malleable and/or plastic material that aids in controlling bulbing of the sleeve 90. In other illustrative embodiments, the throughbore 92 may have a constant diameter. While the sleeve 90 is illustrated as having a cylindrical throughbore 92 and a cylindrical counterbore 98, other suitable shapes and/or configurations are possible.

The grip compensator 110, as seen in FIGS. 1A, 1B, 5A, and 5B, includes a generally cylindrical body 112 having a generally cylindrical throughbore 114 extending between first and second ends 116, 118 thereof. A first enlarged, outwardly extending annular flange 120 is disposed at the first end 116 of the grip compensator 110 and a second enlarged, outwardly extending annular flange 122 is optionally disposed at the second end 118 of the grip compensator 110. The grip compensator 110 further includes a bulbing region 124 disposed between the first and second ends 116, 118.

The grip compensator 110 may be made of a lighter weight material, such as titanium, or a titanium alloy, for weight-critical applications. Alternatively, a lower cost free-machining material, such as AISI 303Se, could be used for cost-critical applications.

Referring to FIGS. 1A and 1B, a drive nut 130 includes a throughbore 132 that may be threaded between first and second ends 134, 136 of the drive nut 130. Optionally, one or more portions of the throughbore 132 may be unthreaded, such as at the second end 136. As best seen in FIG. 1A, the drive nut 130 includes a plurality of outer wrenching surfaces 138 for engagement by a tool, as will be discussed in greater detail below.

As seen in FIGS. 1A and 1B, the fastener 30 is assembled with the generally cylindrical corebolt 70 disposed through each of the generally cylindrical body 32, the deformable sleeve 90, the grip compensator 110, and the drive nut 130. The body 32 is generally disposed above a central portion of the corebolt 70. The first end 94 of the deformable sleeve 90 is adjacent or in contact with the second end 46 of the body 32 with the sleeve 90 being disposed between the second end 46 of the body 32 and the second end 74 of the corebolt 70. The first end 116 of the grip compensator 110 is adjacent or in contact with the second end 96 of the deformable sleeve 90 and the second end 118 of the grip compensator 110 is adjacent or in contact with the enlarged head 75 at the second end 74 of the corebolt 70. The second end 136 of the drive nut 130 is disposed adjacent the enlarged head 40 of the body 32.

The fastener 30 is installed within two or more panels forming a workpiece 150. The fasteners 30 disclosed herein may be inserted within and suitably installed within workpieces 150 having thicknesses ranging between a minimum grip thickness and a maximum grip thickness, wherein maximum grip is generally defined as $\frac{1}{16}$ inch more than minimum grip for a particular length fastener. When a minimum grip condition is referenced, it is meant that the fastener 30 is installed within the workpiece 150 having a minimum grip thickness for a particular length fastener 30. Similarly, when a maximum grip condition is referenced, it is meant that the fastener 30 is installed within a workpiece 150 having a maximum grip thickness. An under-minimum grip refers to a condition in which a minimum grip has not been reached, which is undesirable. An over-maximum grip refers to a condition in which a maximum grip has been exceeded, which is also undesirable. While a particular fastener having a specific design grip range is disclosed herein, the principles of the present disclosure may be utilized for fasteners having any design grip range. Further, some fasteners may have a design grip range, for example $\frac{1}{16}$ inch, and a usable grip range, for example $\frac{3}{32}$ inch. For such fasteners, an out-of-grip condition requiring "flagging" for such a fastener would be installation outside the usable grip range.

The fastener 30 is installed using blind bolt installation tools as are known in the art. The workpiece 150 is generally comprised of two or more sheets, or panels of material, or two or more structural elements. Before installation of the fastener 30 within the workpiece 150, the fastener 30 is inserted into aligned apertures in the panels forming the workpiece 150. A tool is used to rotationally restrain the drive nut 130, which is pressed into contact with the enlarged head 40 of the body 32 or inserted within the recesses 50 in the enlarged head 40, thereby also rotationally restraining the body 32. Alternatively, the body 32 may be restrained by inserting a portion of the installation tool directly into the recesses 50 in the enlarged head, by a restrained drive nut that is integral with the body 32, by an interference fit of the body within the workpiece 150 aperture, and/or by any other suitable manner. For protruding head bodies or bodies of other fasteners that may be non-round, the bodies may be rotationally retrained in any of the previously noted manners or by a hexagonal or non-round socket tool engaging a corresponding shape on the head of the body.

With the body 32 restrained, another part of the installation tool engages the wrenching surfaces 76 of the corebolt 70 to rotate the corebolt 70. Rotation of the corebolt 70 in relation to the restrained body 32 advances the corebolt 70 inwardly (toward the workpiece 150) through the body 32. As the corebolt 70 moves through the body 32, the enlarged head 75 of the corebolt 70 pushes the grip compensator 110 and the deformable sleeve 90 toward the workpiece 150. More specifically, when installed in the design grip range, the corebolt 70 advances through the body 32 until the tapered ramp 44 at the second end 46 of the body 32 comes into abutment with the stop shoulder 82 of the corebolt 70. The first end 94 of the sleeve 90 moves up and over the tapered ramp 44 disposed at the second end 46 of the body 32 until the first end 94 of the sleeve 90 comes in contact with the workpiece 150. At that point, further rotation of the corebolt 70 compresses the sleeve 90 against the workpiece 150 to form a blind head 160, as seen in FIGS. 6A-7B. After the blind head 160 has been formed, the torque necessary to advance the corebolt 70 further rises above the torsional strength of the breaking groove 78, causing the pintail 80 of the corebolt 70 to separate from the installed fastener 30. After full installation of the fastener 30, the breaking groove 78 in the corebolt 70 is positioned as to be substantially flush with an outer surface 162 of the enlarged head 46 of the body 32 when the second end 44 of the body 32 comes to bear against the stop shoulder 82 of the corebolt 70.

Figure 6A:
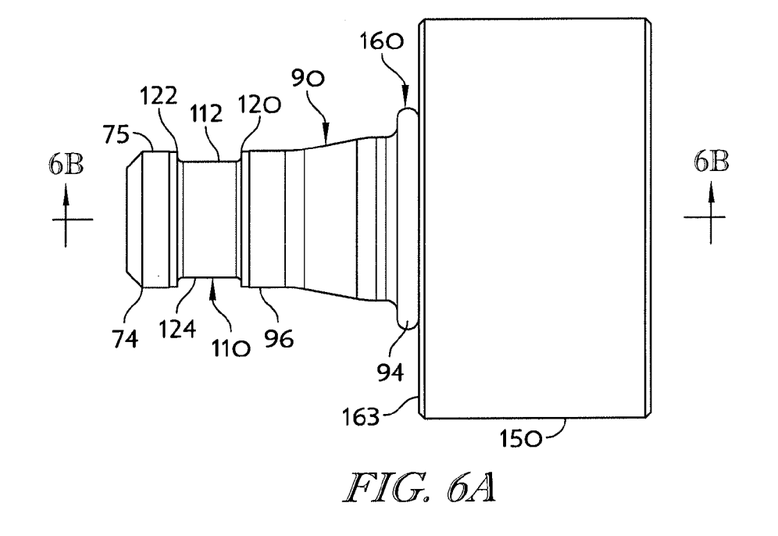
FIG. 6A is a side elevational view of the fastener of FIGS. 1A and 1B after installation in a minimum grip condition.
Figure 6B:
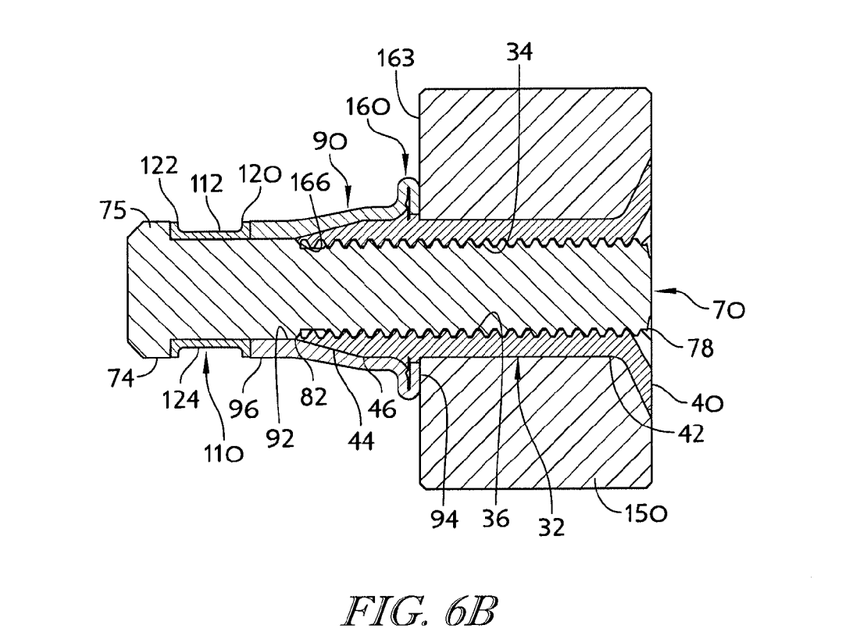
FIG. 6B is a cross-sectional view taken generally along the lines 6B-6B of FIG. 6A.
Figure 7A:
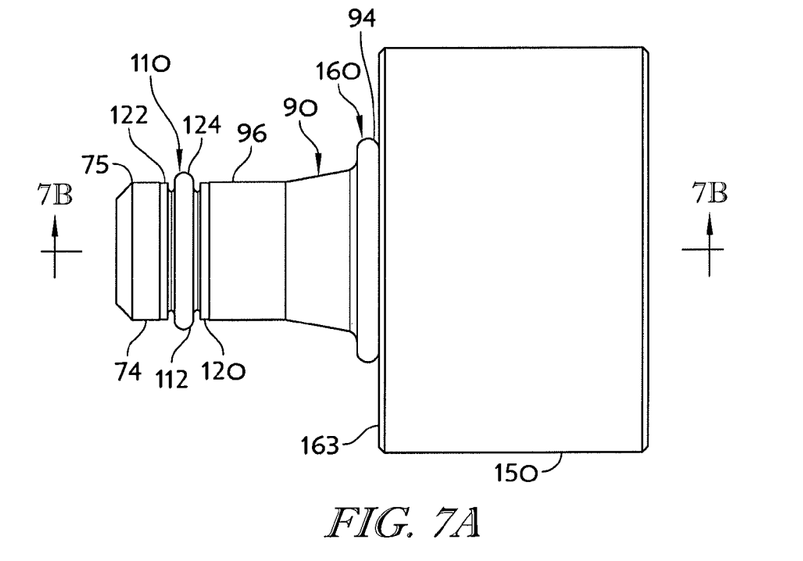
FIG. 7A is a side elevational view of the fastener of FIGS. 1A and 1B after installation in a maximum grip condition.
Figure 7B:
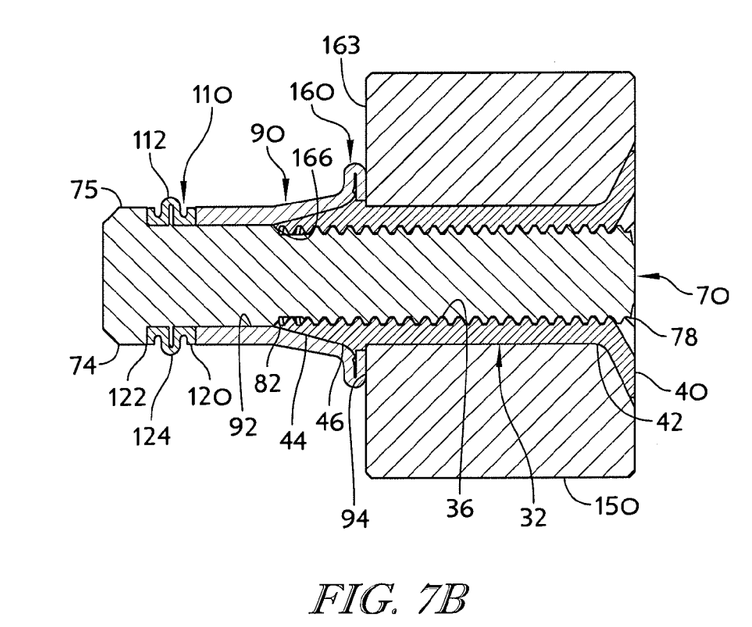
FIG. 7B is a cross-sectional view taken generally along the lines 7B-7B of FIG. 7A.

During installation, the grip compensator 110 is configured to collapse, as necessary, to accommodate different workpiece thicknesses. For example, FIGS. 6A and 6B depict the fastener 30 installed in a workpiece 150 having a thickness corresponding to a minimum grip for a particular length of fastener 30. In this grip condition, the grip compensator 110 collapses little, if at all. When the fastener 30 is installed in a workpiece 150 that is thicker, as seen in FIGS. 7A and 7B, the grip compensator 110 collapses to a greater extent because less space is available between the panel blind side surface 163 and the enlarged head 75 of the corebolt 70. In illustrative embodiments, a load required to collapse the grip compensator is higher than a load required to induce a minimum required preload in the installed fastener 30. In further illustrative embodiments, the load required to collapse the grip compensator varies by no more than 25% over a range of collapse of $\frac{1}{16}$ inch.

With threaded blind bolts, it is oftentimes necessary to induce and maintain a high level of preload in an installed fastener to prevent joint slippage in service. For example, a $\frac{1}{4}$ inch blind bolt is typically required to maintain a preload level, or residual clamp load, of between 1000 and 1600 pounds—about half the required ultimate tensile strength of the fastener. Consequently, the grip compensator 110 should be capable of collapsing at a substantially constant compressive load that is slightly above the required preload. If the collapse load progressively decreases at too great a rate, then one runs the risk of having an installed fastener with less than the desired level of preload or, if the collapse load progressively increases at too great a rate, causing separation a frangible portion of the corebolt before a breaking groove of the corebolt has become flush with the outer surface of the enlarged body head. In illustrative embodiments, the collapse load is equal to or slightly greater than a required preload, but less than an ultimate required tensile strength.

In illustrative embodiments, the stop shoulder 82 may cause deformation of the tapered ramp 44 at the second end 46 of the body 32, thereby resulting in increased friction and possible mechanical locking between the corebolt 70 and body 32 such that resistance to loosening in service (after installation) is improved. For example, material forming the body 32, for example at the tapered end 44, may be deformed inwardly into a groove 166 formed by the stop shoulder 82. Alternatively, threads on the inner surface 36 of body 32 may be compressed onto the threading of the corebolt 70.

In illustrative embodiments, the second end 96 of the sleeve 90 may be strain hardened to resist expanding ("tuliping") over the flange 120 of the grip compensator 110. For example, an outer diameter of the second end 96 of the sleeve 90 may be machined oversized and, after an annealing treatment, the sleeve 90 may be pushed through a sizing die. Variations on this technique may involve other sizing methods, such as crimping or roll forming second end 96 of the sleeve 90, or machining of an inner diameter of the sleeve 90 to a smaller diameter and resizing the inner diameter after an annealing treatment.

In still other illustrative embodiments, the second end of the sleeve 90 may be made harder than a remainder of the sleeve 90 by selective heat treatment. In an illustrative embodiment, the first end 94 of the sleeve may be induction annealed and/or the second end 96 of the sleeve 90 may be induction hardened.

Figure 8A:
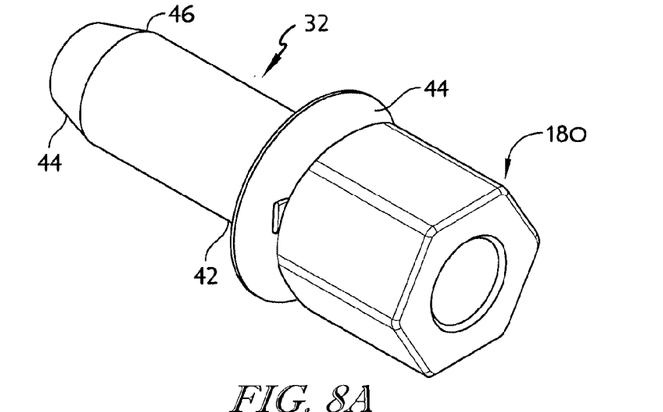
FIG. 8A is a perspective view of a body of an alternative embodiment of a fastener, wherein a frangible drive nut is integral with the body.
Figure 8B:
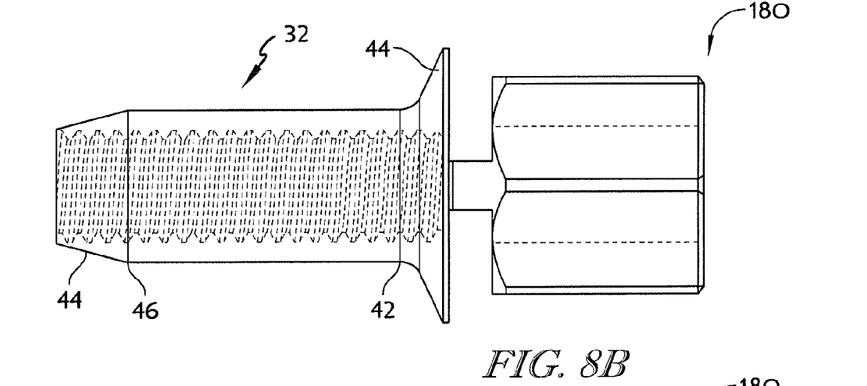
FIGS. 8B and 8C are side elevational views of the body of FIG. 8A.
Figure 8C:
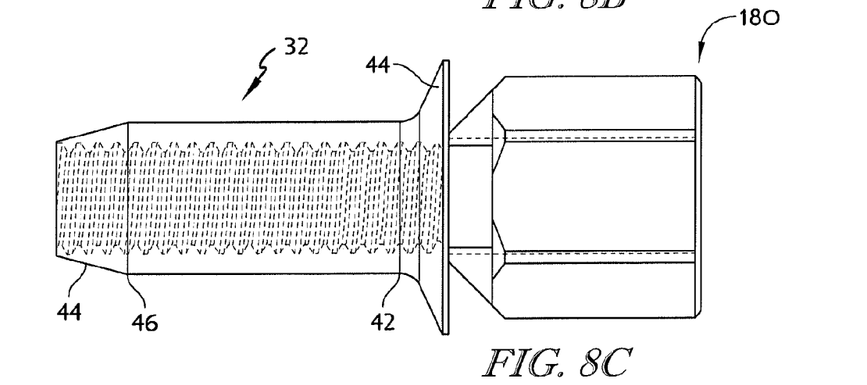

In an alternative illustrative embodiment, as seen in FIGS. 8A-8C, the body 32 may include a drive nut 180 that is incorporated into or integral with the enlarged head 44 of the body 32. In a further alternative illustrative embodiment, in lieu of a drive nut 130 or 180, an outer surface of the enlarged head 44 of the body 32 may incorporate recesses or protrusions that are used to rotationally restrain the body 32.

Figure 9A:
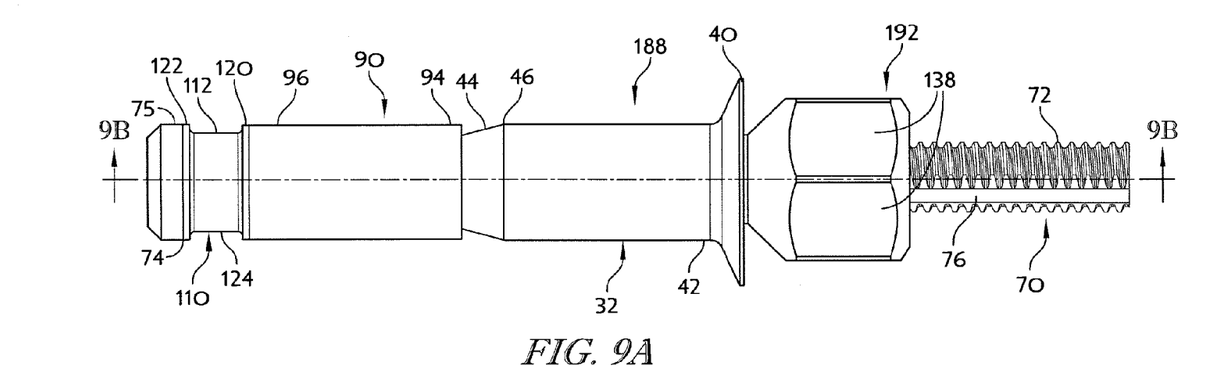
FIG. 9A is a side elevational view of a further embodiment of a fastener having a corebolt that engages a threaded insert positioned within an enlarged head of the body.
Figure 9B:
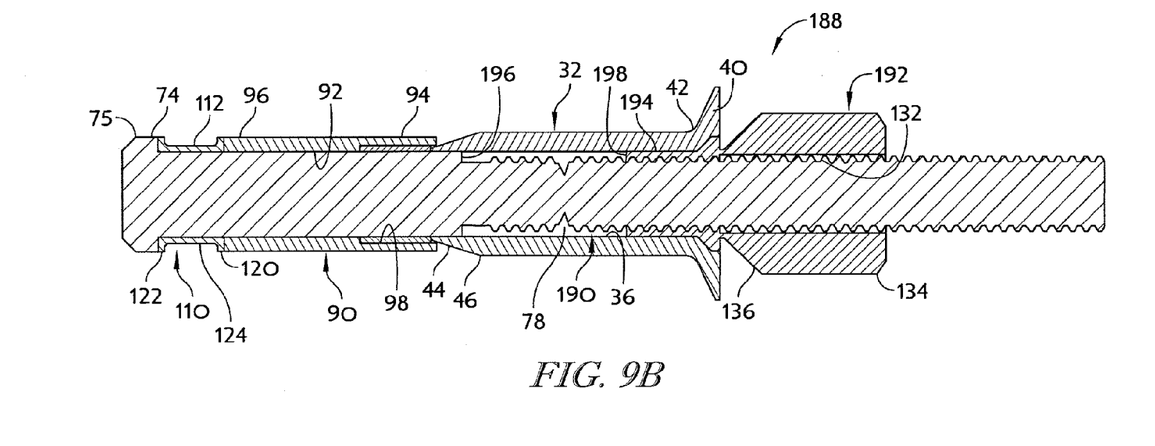
FIG. 9B is a cross-sectional view taken generally along the lines 9B-9B of FIG. 9A.

In yet another illustrative embodiment, as seen in FIGS. 9A and 9B, the throughbore 34 of the body 32 of fastener 188 may be enlarged such that a gap 190 is formed between the corebolt 70 and the inner surface 36 of the body 32. A drive nut 192 may be similar to the drive nut 130 except that the drive nut 192 includes a hollow threaded insert 194 that extends from the second end 136 of the drive nut 192. When the drive nut 192 is disposed about the corebolt 70, the threaded insert 194 extends into the gap 190 between the corebolt and the inner surface 36 of the body 32. As discussed above, the drive nut 180 may rotationally restrain the body 32 in any manner disclosed herein, for example by an interference fit, or any other suitable manner.

Figure 10A:
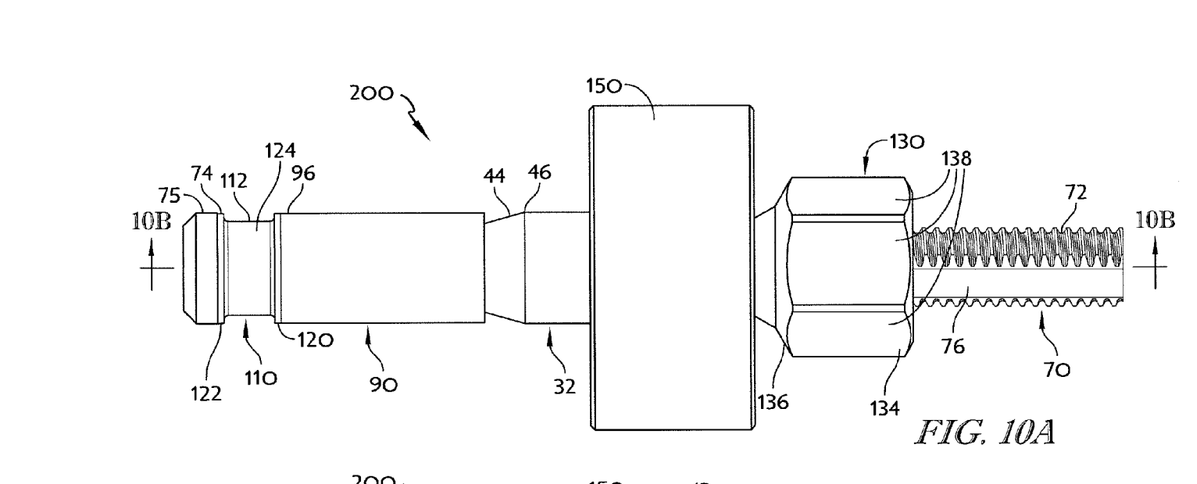
FIG. 10A is a side elevational view of another embodiment of a fastener in which a stopping shoulder is formed as a frangible stop ring extending outwardly from the corebolt.
Figure 10B:
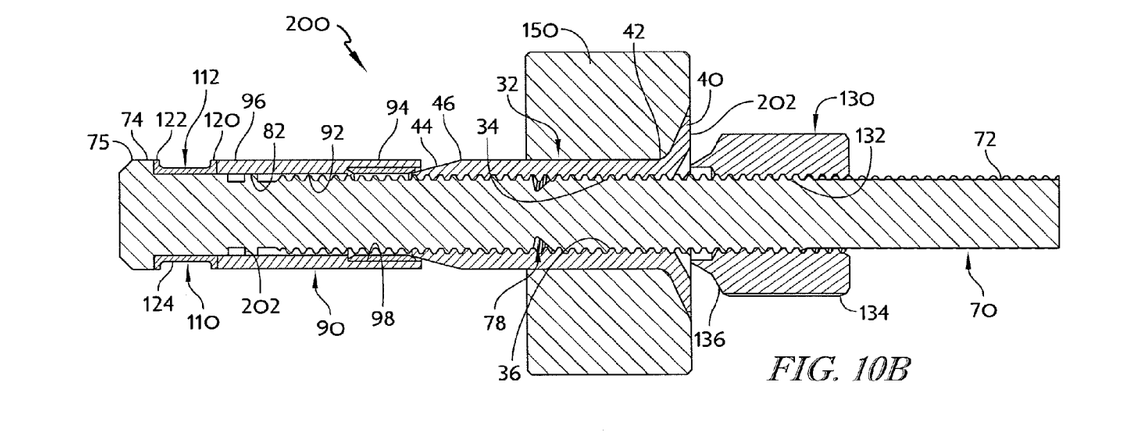
FIG. 10B is a cross-sectional view taken generally along the lines 10B-10B of FIG. 10A.
Figure 11A:
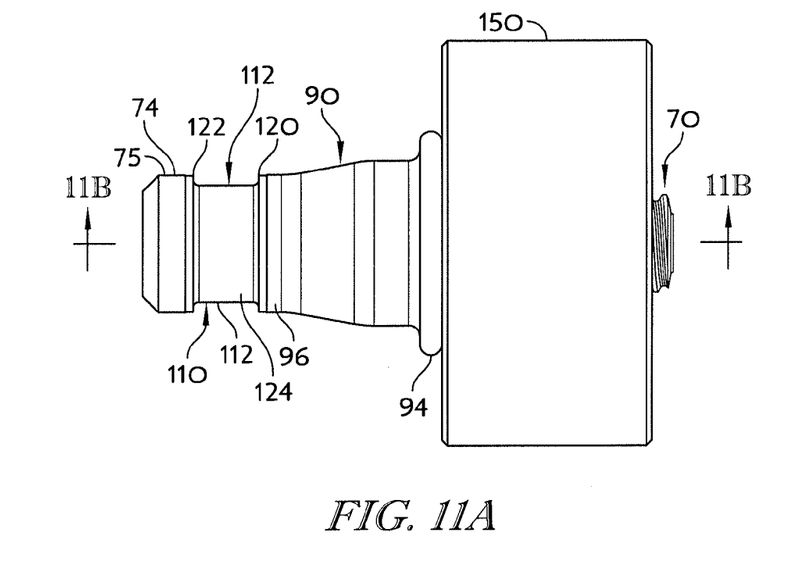
FIG. 11A is a side elevational view of the fastener of FIGS. 10A and 10B after installation in a under-grip condition.
Figure 11B:
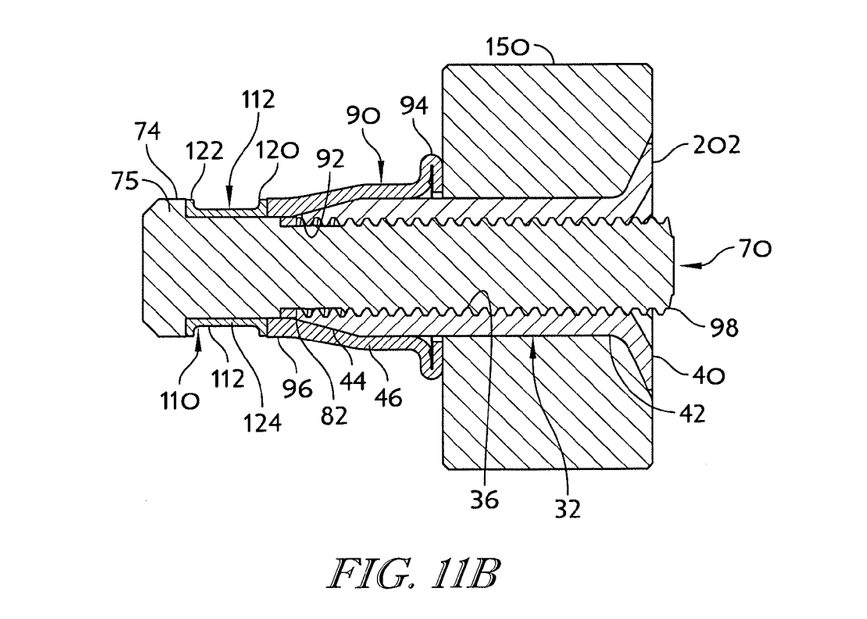
FIG. 11B is a cross-sectional view taken generally along the lines 11B-11B of FIG. 11A.
Figure 12A:
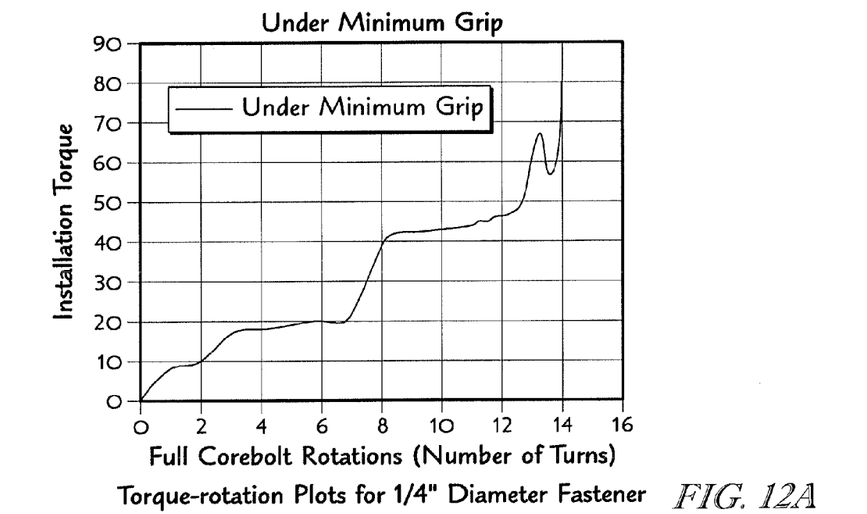
FIGS. 12A-12D show typical Torque versus Corebolt Rotations for hypothetical under-minimum grip, minimum grip, maximum grip, and over-maximum grip conditions, respectively.
Figure 12B:
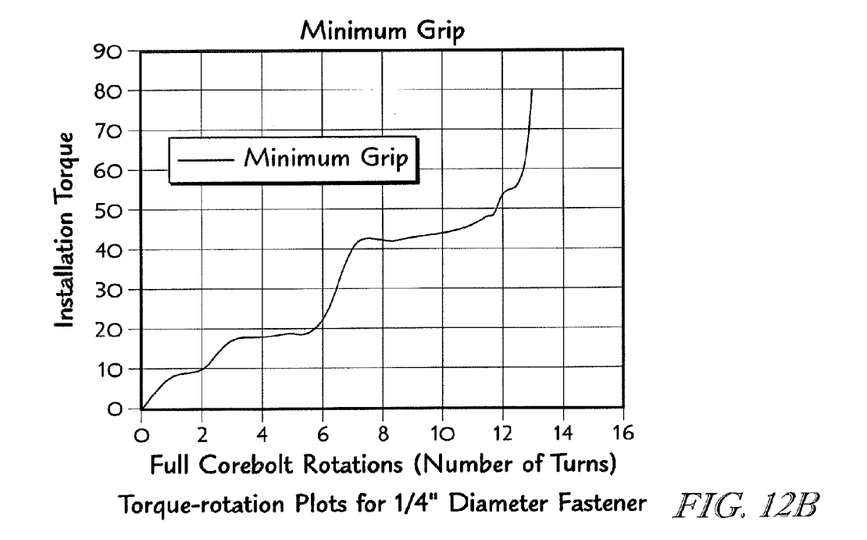
Figure 12C:
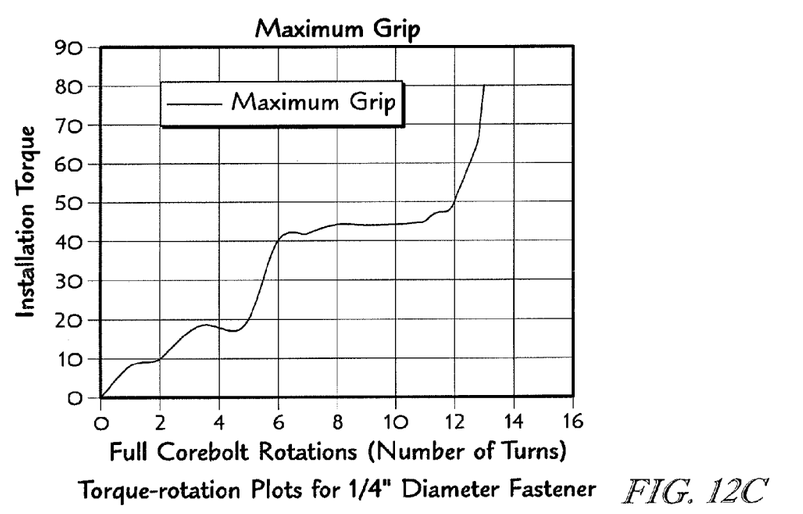
Figure 12D:
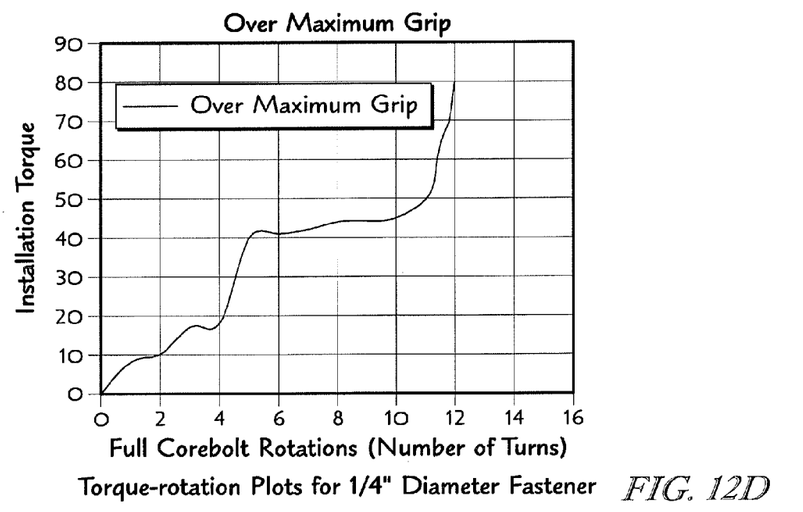
Figure 13A:
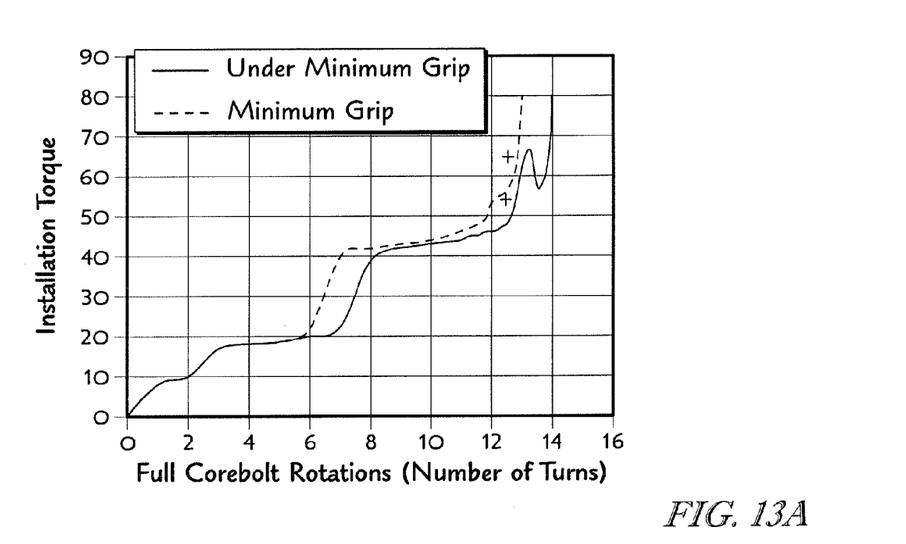
FIG. 13A is an overlay of the under-minimum grip and minimum grip graphs of FIGS. 12A and 12B.
Figure 13B:
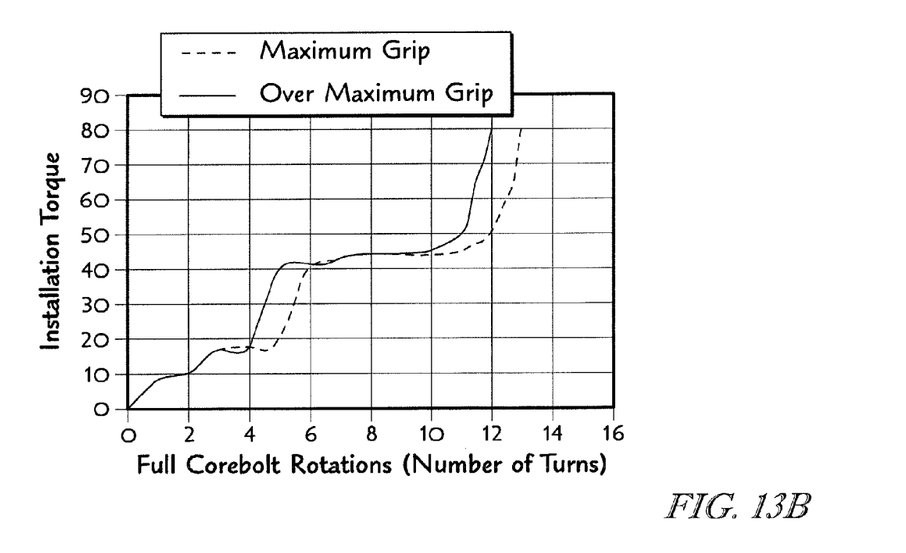
FIG. 13B is an overlay of the maximum grip and over-maximum grip graphs of FIGS. 12C and 12D.

Another illustrative embodiment of a fastener 200 is shown in FIGS. 10A and 10B. The fastener 200 of FIGS. 10A and 10B is similar to the fastener 30 of FIGS. 1A and 1B, except that a frangible stop ring 202 is formed as part of the corebolt 70 and may be configured to break under a particular load.

Referring to FIGS. 12A-13B, the torque required to advance the corebolt 70 through the body 32 is shown for four different grip conditions for a ¼ inch diameter fastener 200, as seen in FIGS. 10A-11B. In this hypothetical example, the installation torque, that is, the torque required to separate the pintail 80 of the corebolt 70, is 80 inch-pounds. In maximum grip (FIG. 12C) and over-maximum grip conditions (FIG. 12D), the grip adjuster collapses at an applied torque of approximately 45 inch-pounds. The fastener 200 is configured to bring the stop ring 202 acting as a stop shoulder into contact with the tapered ramp 44 at the second end 46 of the body 32 after 12½ rotations and to separate the pintail 80 of the corebolt 70 after 13 rotations. In the over-maximum grip condition of FIG. 12D, the installation is terminated after 12 turns of the corebolt 70, resulting in the corebolt 70 breaking below-flush.

In maximum (FIG. 12C) and minimum grip (FIG. 12B) conditions, the corebolt 70 reaches 80 in-lb torque after 13 corebolt rotations for a substantially flush corebolt 70 break.

In the under-minimum grip condition (FIGS. 11A, 11B, and 12A), the stop shoulder 82 of the corebolt 70 comes into abutment with tapered ramp 44 of the body 32 after 12½ rotations but, because the load taken up by sleeve 90 formation is below some threshold, the stop ring 202 carries a larger share of the reaction load from the corebolt 70. For example, if the load required to form the sleeve 90 in this under-minimum grip condition is 1175 pounds after 12½ corebolt rotations but the applied torque climbs to 60 in-lb for a corebolt driving force of 1500 lb, then the stop ring 202 is subjected to a shearing load of 325 lbf. If the stop ring 202 has been configured to separate at 325 pounds, then further driving of the corebolt 70 will cause the stop ring 202 to separate from the corebolt 70, thereby causing the breaking groove 78 to advance beyond an outer surface 202 of the enlarged head 40 of the body 32. This condition indicates to a user that the fastener is installed in an under-minimum grip condition. In this example, the relationship between applied torque and driving force has been assumed to be 25 pounds driving force for each in-lb of applied torque.

The fasteners herein produces a predictable and consistent flush installation throughout a recommended, or design, grip range with a substantially uniform level of residual clamp load, and that minimizes the need for post-installation milling or potting. The fasteners also offer flexibility in the selection of component materials to minimize weight, cost, or other parameters such as material incompatibility. Still further, some of the embodiments disclosed herein provide a reliable means to flag unacceptable out-of-grip installations.

Any of the embodiments described herein may be modified to include any of the structures or methodologies disclosed in connection with other embodiments or disclosed generally herein.

Further, although directional terminology, such as upper, lower, etc. may be used throughout the present specification, it should be understood that such terms are not limiting and are only utilized herein to convey the orientation of different elements with respect to one another.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A fastener, comprising:
a body having an enlarged head at a first end, a tapered ramp at a second end, a cylindrical shank disposed between the enlarged head and the tapered ramp, and a passage extending between the first and second ends;
a generally cylindrical corebolt disposed within the passage of the body and having an enlarged head, a breaking groove, and a stop shoulder that is configured to cause an abrupt increase in resistance to threading the corebolt into the body when the breaking groove is substantially flush with an outer surface of the enlarged head of the body;
a grip compensator disposed on the corebolt in abutment with the enlarged head of the corebolt;
a deformable sleeve having a generally cylindrical passage therethrough, wherein the deformable sleeve is movably disposed over a portion of the corebolt and disposed between the grip compensator and the tapered ramp of the body; and means for restricting rotation of the body until the sleeve has formed a blind head against a workpiece, wherein the stop shoulder is in the form of a frangible stop ring that is configured to separate under a predefined load.

2. The fastener of claim 1, wherein when the fastener is installed, the tapered ramp of the body abuts the stop shoulder of the corebolt and the corebolt severs at the breaking groove.

3. The fastener of claim 1, wherein a load required to partially deform the grip compensator is higher than a load required to induce a minimum required preload in the installed fastener.

4. The fastener of claim 1, wherein a load required to partially deform the grip compensator varies by no more than 25% over a range of collapse of 1/16 inch.

5. The fastener of claim 1, wherein a minimum hardness of the grip compensator is greater than a minimum hardness of the deformable sleeve.

6. The fastener of claim 1, wherein the grip compensator includes an outwardly extending flange at an end thereof that is adjacent the deformable sleeve.

7. The fastener of claim 6, wherein an end of the deformable sleeve adjacent the grip compensator is hardened to prevent movement of the end of the deformable sleeve over the flange of the grip compensator.

8. A fastener, comprising:

a body having an enlarged head with an outer surface at a first end, a tapered ramp at a second end, a cylindrical shank disposed between the enlarged head and the tapered ramp, and a passage extending between the first and second ends;

a generally cylindrical corebolt disposed within the passage of the body and having an enlarged head, a breaking groove, and a frangible stop ring that is configured to separate from the corebolt when the fastener is installed in an under-minimum grip condition;

a grip compensator disposed on the corebolt in abutment with the enlarged head of the corebolt;

a deformable sleeve having a generally cylindrical passage therethrough, wherein the deformable sleeve is movably disposed over a portion of the corebolt and disposed between the grip compensator and the tapered ramp of the body; and means for restricting rotation of the body until the sleeve has formed a blind head against a workpiece;

wherein, when a thickness of the workpiece is within a grip range of the fastener, the corebolt breaks substantially flush with an outer surface of the enlarged head of the body and, when fastener is installed in the under-minimum grip condition, the corebolt breaks at least 0.010 inch above an outer surface of the enlarged head of the body.

9. The fastener of claim 8, wherein the grip compensator includes an outwardly extending flange at an end thereof that is adjacent the deformable sleeve.

10. The fastener of claim 9, wherein an end of the deformable sleeve adjacent the grip compensator is hardened to prevent movement of the end of the deformable sleeve over the flange of the grip compensator.

* * * * *